United States Patent [19]

Duvochel et al.

[11] 4,142,242

[45] Feb. 27, 1979

[54] MULTIPLIER ACCUMULATOR

[75] Inventors: Henri P. Duvochel, Nice; Roland E. Kuhne, La Colle sur Loup; Bernard P. Laurent, St Laurent du Var, all of France

[73] Assignee: International Business Machines Corporation, Armonk, N.Y.

[21] Appl. No.: 850,312

[22] Filed: Nov. 10, 1977

[30] Foreign Application Priority Data

Dec. 11, 1976 [FR] France .................. 76 34820

[51] Int. Cl.² .............................. G06F 7/52
[52] U.S. Cl. ................................. 364/759
[58] Field of Search ............... 364/757, 758, 759, 724

[56] References Cited

U.S. PATENT DOCUMENTS

3,311,739  3/1967  Aiken et al. .................. 364/759

*Primary Examiner*—Jerry Smith
*Attorney, Agent, or Firm*—Edward S. Gershuny

[57] ABSTRACT

Multiplier accumulator device for performing the algebraic sum $\Sigma \pm A_i B_i$ of products of n-bit operands expressed in two's complement form. The accumulator is divided in two n-position halves, and the rightmost position of the accumulator is linked to the leftmost position. The product partial sums are alternately accumulated into the left and right halves in such a manner that partial products of like weight are added together. Each position of the accumulator is an adding cell except the leftmost positions of the right and left parts which are subtractive cells.

8 Claims, 8 Drawing Figures

MULTIPLIER ACCUMULATOR

BACKGROUND OF THE INVENTION

This invention relates to multiplier-accumulator devices performing the algebraic sum of products of operands and more particularly, to devices of the type processing operands expressed in true form and in two's complement form. In particular, these devices can be used in data or signal processing systems.

In digital signal processing systems, various algebraic operations may be carried out on the signals, in real time, during processing. Consequently, in order not to disturb the processing operation, it is necessary that the results of these operations be obtained as quickly as possible. One of the operations which is often carried out is the accumulation of products of two numbers. An example is the digital filtering function which involves an accumulation of products to obtain the value of each sample of the filtered signal. In effect, each sample $Y_i$ of the filtered signal is equal to $$Y_i = \sum_{k=o}^{n} C_k \cdot X_{i-k}$$

where $X_{i-k}$ represents the samples of the signal to be filtered and $C_k$ the filter coefficients.

In order to have $Y_i$ correctly calculated, it is necessary that the multiplying and accumulating operations involving any sample $X_{i-k}$, be terminated before the arrival of the next sample at the filter input.

There are multiplying-accumulating devices including two particular assemblies, the first one carrying out the multiplications, and the second one carrying out the accumulations. To reduce the time required to obtain the final result, it is possible to increase the speed of each assembly. However, this speed cannot indefinitely be increased and consequently, it is desirable to provide other means to increase the overall speed of the multiplier-accumulators.

An algorithm generally in use to carry out a binary multiplication of two n-bit operands consists in accumulating a series of partial products into a 2n position accumulator. Each partial product is obtained by multiplying the multiplicand by a bit of the multiplier. The low order bit of the multiplier controls the generation of the first partial product. Before adding a new partial product, the sum of the previous partial products is shifted to the right one bit position in the accumulator.

In these multipliers, the first partial product is accumulated into the first n left-hand positions of the accumulator. Due to the shift to the right performed before accumulating the successive partial products, at the end of the multiplying operation, the accumulator contains the final product, with the bit of lowest weight in the right-hand position.

If a second product of two operands is to be added, it is impossible to use the same accumulator since the bits with the same weight of the second set of partial products and of the first product would not be added. Then, it is necessary to provide a second accumulator in which the products are added.

In addition, in these devices, the multiplication does not take the operand sign into account. The signs are separately processed which involves additional circuits and extra time to correct the product sign at the end of each multiplying operation.

Therefore, an object of this invention, is to provide a fast multiplier-accumulator device using the principle of multiplication by successive additions.

Another object of this invention is to provide such a device using a minimum of circuits.

Another object of this invention is to provide such a device able to process positive or negative operands expressed in true form or in two's complement code.

BRIEF DESCRIPTION OF THE INVENTION

The multiplier-accumulator device of this invention calculates the algebraic sum S of n-bit operand products $A_i$, $B_i$, namely $S = \Sigma \pm A_iB_i$. The products are obtained by using the multiplication algorithm known in the art and briefly described above, by successively adding and shifting partial products to the right into a 2n-position accumulator.

According to a preferred embodiment of this invention, the same 2n position accumulator is used to calculate each product and to add the product obtained to the sum of the preceding products. For this purpose, the accumulator is divided in two n-position parts: the left-hand (L.H.) part and the right-hand part (R.H.).

In addition, the rightmost position of the accumulator is linked to the leftmost position. Under control of a clock pulse, the contents of each position of the accumulator is shifted into the next position to the right, and the contents of the rightmost position is shifted into the leftmost position.

The product partial sums will alternatively be added into the L.H. and R.H. parts. For example, in calculating the sum $$S = A_1B_1 + A_2B_2 + A_3B_3 + \ldots + A_{n-1}B_{n-1} + A_nB_n$$

the partial products of the first product $A_1B_1$ will be added into the L.H. part and shifted to the right so that at the end of the multiplying operation, the least significant bit of the first product $A_1B_1$ will be in the rightmost position of the R.H. part. The partial products of the second product $A_2B_2$ will then added into the R.H. part and shifted to the right. Thus, they will be added to the bits with the same weight of the first product. The partial products of the third product $A_3B_3$ will be added into the left and so on.

In general, the partial products of the odd order products are added into the L.H. part of the accumulator, and the partial products of the even order products are added into the R.H. part. But it will be understood that it is possible to choose the reverse order, i.e., to accumulate the odd order products to the right and the even order products to the left.

To take the operand signs, and the signs preceding each product of the sum, into account, the multiplier-accumulator is provided with means for two's complementing the operands so that the multiplying operand, for example $A_i$, is always positive and the product is always to be added to the sum of the preceding products.

Each position of the accumulator consists of a cell with three inputs and two outputs, one of which is called the "sum" output and the second one, the "carry" output. A first input, called the "operand" input, receives a multiplicand bit as controlled by the multiplier bits, i.e., 0 or 1 (if the multiplier bit is "1") or 0 (if the multiplier bit is "0"). The second input, called the "sum" input, receives the sum output of the preceding cell to the left, and the third input receives the carry output of the same cell delayed by one bit period.

To take the multiplicand sign into account, each left-most cell of the R.H. and L.H. parts, is a subtractive cell. That is, this cell is also provided with three inputs and two outputs connected as the inputs and outputs of the adding cells. But in these cells, a negative operand bit or a carry is substracted from the "sum" input bit.

The above and other objects, features and advantages of the invention will be apparent from the following detailed description of a preferred embodiment thereof as illustrated in the accompanying drawings.

DETAILED DESCRIPTION

Figure 1:
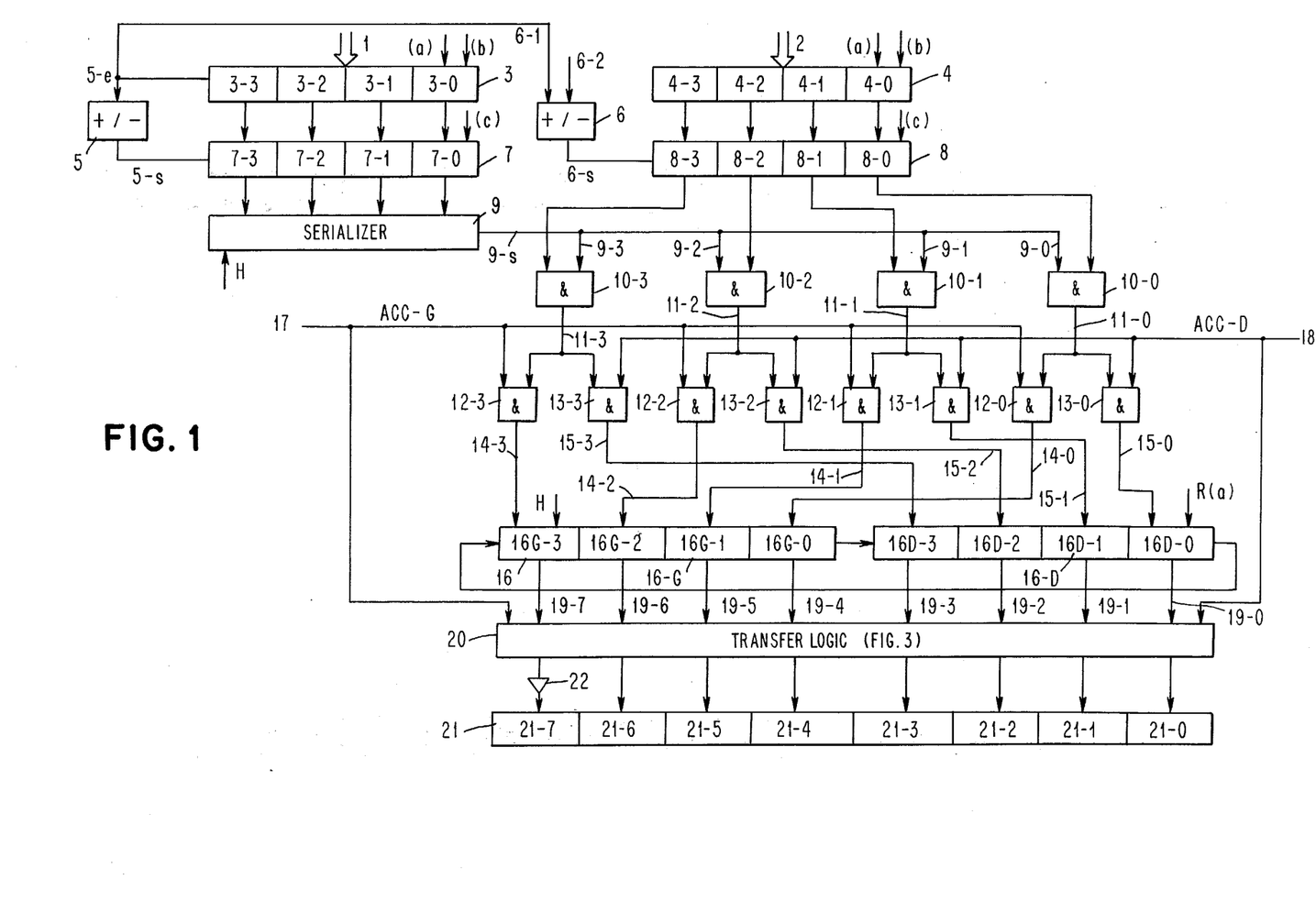
FIG. 1 is a general representation of an embodiment of this invention.

FIG. 1 is a general representation of a preferred embodiment of this invention, assuming that the operands are four-bit binary numbers with positive numbers expressed in true form and negative numbers expressed in two's complement form. The left-most bit is the sign bit. It is equal to 0 for positive numbers and equal to 1 for negative numbers. To obtain the two's complement of a number expressed in this code, it is sufficient to invert all its bits and to add +1 to the number obtained in this way.

In the preferred embodiment of this invention, before multiplying the operands and accumulating the products, each operand is two's complemented or not as required to meet the two following requirements:

1. multiplier: always a positive number.
2. sign preceding the product $A_iB_i$: Always positive.

The table below indicates, in accordance with the sign preceding the product and the sign of the multiplier, whether or not the two's complement of each operand is to be taken. It is assumed that the multiplier is the first operand $A_i$, and the multiplicand is the second operand $B_i$.

TABLE I

| Sign preceding the product | Sign $A_i$ | $A_i$ two's complement ? | $B_i$ two's complement ? |
|---|---|---|---|
| + | + | NO | NO |
| + | − | YES | YES |
| − | + | NO | YES |
| − | − | YES | NO |

The multiplier-accumulator of this invention is shown generally in FIG. 1. Operants $A_i$ and $B_i$ are fed via buses 1 and 2, respectively, and are stored into n-position registers 3 and 4, n being equal to the number of operand bits, i.e., four in this example. Leftmost positions 3-3 and 4-3 contain the sign bits and positions 3-2 to 3-0 and 4-2 to 4-0 contain the magnitude bits.

Two logic circuits 5 and 6 determine whether operands $A_i$ and $B_i$ have to be complemented or not according to the above table.

Logic circuit 5 receives the sign information from the multiplier through line 5-e connected to stage 3-3. Depending upon whether the sign bit is 0 or 1, a "COMPLEMENTATION" control signal is fed by line 5-s to a complementing circuit of multiplier 7.

Logic circuit 6 receives the sign information from the multiplier through line 6-1, and the sign preceding the product through line 6-2. According to the above table, it generates a "COMPLEMENTATION" control signal on its output line 6-s which is applied to a circuit for complementing multiplicand 8.

It is assumed that a high level or "1" COMPLEMENTATION signal indicates that the operand should be complemented and that a low level or "0" signal indicates that the operand should not be modified. But it should be understood that other conventions could be used in accordance with the logic circuits in use.

Consequently, according as the COMPLEMENTATION signals are at high or low level, circuits 7 and 8 complement the operands or pass them unmodified, respectively.

The four bits of the multiplier (or its two's complement) in stages 7-3, 7-2, 7-1, 7-0 are applied to a serializer 9 which will provide these bits in series on output line 9-s, as controlled by clock pulses H.

The bits of the multiplicand (or its complement) in stages 8-3 to 8-0 are applied to four AND gates 10-3 to 10-0, respectively.

The second input of AND gates 10-3 to 10-0 consists in output 9-s of serializer 9. Consequently, every clock time, a bit of the multiplier or its complement is simultaneously applied to AND gates 10 through lines 9-3 to 9-0, starting with the less significant bit.

If this bit is equal to 1, outputs 11-3 to 11-0 of AND gates 10 will deliver signals having logic levels which correspond to the ones of the multiplicand or its complement contained in circuit 8. Conversely, if this bit is equal to 0, the signals carried by lines 11-3 to 11-0 represent logic level 0.

Outputs 11-3 to 11-0 of AND circuits 10 are applied to two series of gates 12-3 to 12-0 and 13-3 to 13-0, output 11-3 being applied to gates 12-3 and 13-3 at the same time, output 11-0 being applied to gates 12-0 and 13-0 also at the same time.

Outputs 14-3 to 14-0 of gates 12-3 to 12-0 are connected to the first four L.H. stages 16G-3 to 16G-0 of an eight-stage accumulator 16. Outputs 15-3 to 15-0 of gates 13-3 to 13-0 are connected to the four R.H. stages 16D-3 to 16D-0 of accumulator 16. It should be understood that the number of stages in the accumulator depends on the number of bits of the operands. With n-bit operands, the accumulator should have 2n stages and the number of gates and AND circuits as well as the length of registers 3 and 4 and of circuits 7 and 8 should accordingly be modified.

Rightmost stage 16D-0 is connected to leftmost stage 16G-3. Under control of clock pulses, the bit appearing at the "sum" output of a cell, is applied to the "sum" input of the next cell and the bit appearing at the "carry" output is applied to the "carry" input of the same cell.

Stages 16G-2, 16G-1, 16G-0 and 16D-2, 16D-1, 16D-0 are adding cells, an embodiment of which will be described later with reference to FIG. 4, and stages 16G-3 and 16D-3 are subtracting cells, an embodiment of which will be described with reference to FIG. 5.

Gates 12-3 to 12-0 are opened by a L.H. accumulation control signal ACC-G on line 17 and gates 13-3 to 13-0 are opened by a R.H. accumulation control signal ACC-D on line 18.

The "sum" outputs of the accumulator cells, 19-0 to 19-7 are connected to a logic circuit 20 which transmits the "sum" bits of the accumulator into an output register 21 in an order depending on the number of products which are accumulated. This logic circuit 20 receives as control signals, signals ACC-D and ACC-G through lines 18 and 17.

Before proceeding to a description of the operation of the circuit shown in FIG. 1, the operation of the accumulator cells will briefly be described. Details of an embodiment of those cells will be described later.

The adding cells are conventional cells with three inputs and two inputs. One of the outputs is called the "sum" output and provides a bit equal to the sum modulo 2 of the three bits applied to the inputs. The second output, called "carry" output, provides the carry bit of the summing operation of the three input bits. A first input receives a bit called "operand bit" provided by complementation circuit 8 through AND gates 10 and gates 12 or 13 associated with the corresponding cell, as indicated by the suffixes following the references. The second "sum" input receives the bit on the "sum" output of the L.H. cell and the third, "carry", input receives the carry bit of the same cell delayed by a clock period. The truth table is as follows:

TABLE II

| Input bits | | | Output bits | |
|---|---|---|---|---|
| Operand | Sum | Carry | Sum | Carry |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

Subtractive cells 16G-3 and 16D-3 also include three "operand", "sum" and "carry" inputs and two "sum" and "carry" outputs connected as the inputs and outputs of the adding cells. In these cells, the "operand" and "carry" input bits which are negative, are substracted from the "sum" bit which is positive according to the following truth table:

TABLE III

| Input bits | | | Output bits | |
|---|---|---|---|---|
| Operand | Sum | Carry | Sum | Carry |
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 |

The circuit operation will be described while referring to FIG. 2 which shows the operation timing. To make the understanding of this description easier, it is assumed that the algebraic sum S of three products $A_1B_1$, $A_2B_2$, $A_3B_3$ is to be carried out $$S = - A_1B_1 + A_2B_2 + A_3B_3$$

with $A_1 = 1010$    $B_1 = 1101$
$A_2 = 0111$    $B_2 = 1100$
$A_3 = 1010$    $B_3 = 0101$ The decimal equivalent of the above expression is $$S = -(-6)(-3) + (7)(-4) + (-6)(5).$$

Figure 2:
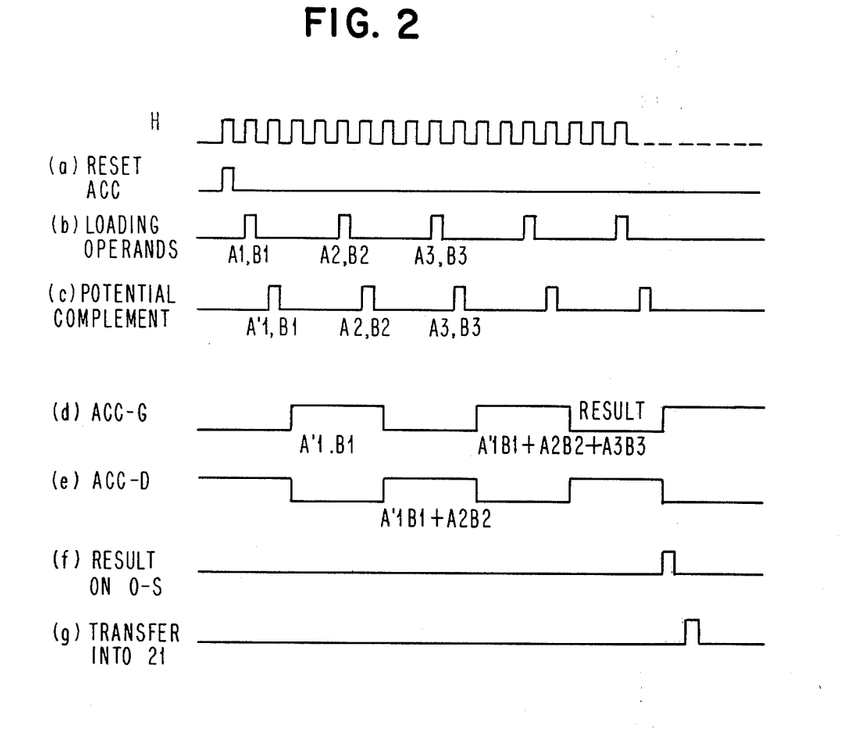
FIG. 2 is a time chart showing the control signals required by the circuit of FIG. 1.

During an initiating phase, the registers and cells 16G-3 to 16G-1 and 16D-3 to 16D-0 of the accumulator are set to 0 by signal (a) of FIG. 2 and cell 16G-0 is set to 1. The purpose of these settings will be explained later.

Then, the two operands of the first product $A_1B_1$ are loaded into registers 3 and 4 as controlled by signal (b). Under control of signal (c), a potential complementation is performed. The sign of $A_1$ is tested and since it is negative, $A_1$ will be two's complemented in circuit 7 in accordance with truth table I. $B_1$ is not complemented.

Circuit 7 provides serializer 9 with the two's complement of $A_1$, i.e., $A'_1 = 0110$ and the complementing circuit provides AND gates 10 with multiplicand $B_1 = 1101$.

During a first multiplying phase controlled by clock pulses H, serializer 9 delivers the bits of operand $A'_1$ at its output 9-s. During this first multiplying phase, signal ACC-G opens gates 12-3, 12-2, 12-1 and 12-0 and consequently, the partial products of multiplicand $B_1$ by the bits of $A'_1$ are stored into L.H. part 16G of the accumulator.

When the first multiplication is completed, the result is in the accumulator, the least significant bit being at the "sum" output of cell 16D-1, ready to be applied to the "sum" input of the next cell to the right, 16D-0.

Before completing this multiplication, the two new operands $A_2$ and $B_2$ are loaded into registers 3 and 4 (see FIG. 2). They may be complemented. In this case, they remain unmodified and the second multiplication is carried out. The partial products are added into the R.H. part of the accumulator which contains the less significant bits of the preceding product, under control of signal ACC-D the level of which is high at this instant, which opens gates 13-3, 13-2, 13-1 and 13-0.

At the end of the second multiplication, the least significant bit of sum $A_1B_1 + A_2B_2$ is applied to the "sum" input of cell 16G-0.

Subsequently, the third product which is calculated as before, is stored into the L.H. part of the accumulator. Multiplier $A_3$ being negative, it should be two's complemented, which gives $A'_3 = 0110$ and $B_3$ should also be two's complemented, which gives $B'_3 = 1011$.

The following table IV indicates the states of the inputs and outputs of the various cells of accumulator 16, i.e., G-3 to G-0 and D-3 to D-0 as the multiplying and adding operations are performed. The "operand" and "sum" inputs of the cells are referenced I-Op and I-S and the "sum" and "carry" outputs are referenced S and C, respectively. Output C, provided at a clock period by a cell, sets up input I-C of the same cell at the next period.

References "L" and "m" mean "least significant bit" and "most significant bit", respectively.

When the three products are stored, four additional clock periods are required to obtain the final result because all the carries which can remain in the various positions have to be added.

As mentioned above, the accumulator is initially loaded so that the "sum" outputs of the eight cells are set to 00010000, respectively, so that when the first operand is stored, the "sum" input of cell 16D-3 is set to 1. This bit 1 at this sum input, is a separating bit preventing the carries generated in the positions of the most significant bits from being propagated, since they would then be added to the least significant bits.

$$S = -A_1B_1 + A_2B_2 + A_3B_3$$

except that the highest order bit must be inverted in order to remove the effect of the separator bit that was initially loaded. Thus, the first term is the binary number 11101110 which we recognize as negative because the highest-order bit is "1". The two's complement is

TABLE IV

| | Cell Condition | G-3 | G-2 | G-1 | G-0 | D-3 | D-2 | D-1 | D-0 | Products |
|---|---|---|---|---|---|---|---|---|---|---|
| | S | 0 | 0 | 0 | 1 | 0 | 0 | 0 | 0 | |
| | C | 0 | 0 | 0 | 0 | 0 | 0 | 0 | 0 | |
| | I-Op | 0 | 0 | 0 | 0 | | | | | 0110 × 1101 |
| | I-S | 0 | 0 | 0 | 0 | 1 | 0 | 0 | 0 | |
| | S | 0 | 0 | 0 | 0 | 1 | 0 | 0 | 0 | |
| | C | 0 | 0 | 0 | 0 | 0 | 0 | 0 | 0 | |
| L | I-Op | 1 | 1 | 0 | 1 | | | | | |
| E | I-S | 0 | 0 | 0 | 0 | 0 | 1 | 0 | 0 | |
| F | S | 1 | 1 | 0 | 1 | 0 | 1 | 0 | 0 | |
| T | C | 1 | 0 | 0 | 0 | 0 | 0 | 0 | 0 | |
| — | I-Op | 1 | 1 | 0 | 1 | | | | | |
| A | I-S | 0 | 1 | 1 | 0 | 1 | 0 | 1 | 0 | |
| C | S | 0 | 0 | 1 | 1 | 1 | 0 | 1 | 0 | |
| C | C | 1 | 1 | 0 | 0 | 0 | 0 | 0 | 0 | |
| | I-Op | 0 | 0 | 0 | 0 | | | | | |
| | I-S | 0 | 0 | 0 | 1 | 1 | 1 | 0 | 1 | |
| | S | 1 | 1 | 0 | 1 | 1 | 1 | 0 | 1 | |
| | C | 1 | 0 | 0 | 0 | 0 | 0 | 0 | 0 | |
| | I-Op | | | | | 1 | 1 | 0 | 0 | 0111 × 1100 |
| | I-S | M1 | 1 | 1 | 0 | 1 | 1 | 1 | L0 | |
| | S | 0 | 1 | 1 | 0 | 0 | 0 | 1 | 0 | |
| | C | 0 | 0 | 0 | 0 | 0 | 1 | 0 | 0 | |
| | I-Op | | | | | 1 | 1 | 0 | 0 | |
| R | I-S | 0 | 0 | 1 | 1 | 0 | 0 | 0 | 1 | |
| I | S | 0 | 0 | 1 | 1 | 1 | 0 | 0 | 1 | |
| G | C | 0 | 0 | 0 | 0 | 1 | 1 | 0 | 0 | |
| H | I-Op | | | | | 1 | 1 | 0 | 0 | |
| T | I-S | 1 | 0 | 0 | 1 | 1 | 1 | 0 | 0 | |
| — | S | 1 | 0 | 0 | 1 | 1 | 1 | 0 | 0 | |
| A | C | 0 | 0 | 0 | 0 | 1 | 1 | 0 | 0 | |
| C | I-Op | | | | | 0 | 0 | 0 | 0 | |
| C | I-S | 0 | 1 | 0 | 0 | 1 | 1 | 1 | 0 | |
| | S | 0 | 1 | 0 | 0 | 0 | 0 | 1 | 0 | |
| | C | 0 | 0 | 0 | 0 | 0 | 1 | 0 | 0 | |
| | I-Op | 0 | 0 | 0 | 0 | | | | | 0110 × 1011 |
| | I-S | 0 | 0 | 1 | 01 | M0 | 0 | 0 | 1 | |
| | S | 0 | 0 | 1 | 0 | 0 | 1 | 0 | 1 | |
| | C | 0 | 0 | 0 | 0 | 0 | 0 | 0 | 0 | |
| | I-Op | 1 | 0 | 1 | 1 | | | | | |
| L | I-S | 1 | 0 | 0 | 1 | 0 | 0 | 1 | 0 | |
| E | S | 0 | 0 | 1 | 0 | 0 | 0 | 1 | 0 | |
| F | C | 0 | 0 | 0 | 1 | 0 | 0 | 0 | 0 | |
| T | I-Op | 1 | 0 | 1 | 1 | | | | | |
| — | I-S | 0 | 0 | 1 | 1 | 0 | 0 | 0 | 1 | |
| A | S | 1 | 0 | 1 | 1 | 0 | 0 | 0 | 1 | |
| C | C | 1 | 0 | 0 | 1 | 0 | 0 | 0 | 0 | |
| C | I-Op | 0 | 0 | 0 | 0 | 0 | | | | |
| | I-S | 1 | 1 | 0 | 1 | 1 | 0 | 0 | 0 | |
| | S | 0 | 1 | 0 | 0 | 1 | 0 | 0 | 0 | |
| | C | 0 | 0 | 0 | 1 | 0 | 0 | 0 | 0 | |
| R | I-S | M0 | 0 | 1 | 0 | 0 | 1 | 0 | L0 | |
| E | S | 0 | 0 | 1 | 1 | 0 | 1 | 0 | 0 | |
| S | C | 0 | 0 | 0 | 0 | 0 | 0 | 0 | 0 | |
| U | I-S | 0 | 0 | 0 | 1 | 1 | 0 | 1 | 0 | |
| L | S | 0 | 0 | 0 | 1 | 1 | 0 | 1 | 0 | |
| T | C | 0 | 0 | 0 | 0 | 0 | 0 | 0 | 0 | |
| | I-S | 0 | 0 | 0 | 0 | 1 | 1 | 0 | 1 | |
| | S | 0 | 0 | 0 | 0 | 1 | 1 | 0 | 1 | |
| | C | 0 | 0 | 0 | 0 | 0 | 0 | 0 | 0 | |
| | I-S | 1 | 0 | 0 | 0 | 0 | 1 | 1 | 0 | |
| | C | 0 | 0 | 0 | 0 | 0 | 0 | 0 | 0 | |
| | I-S | 0 | 1 | 0 | 0 | 0 | 0 | 1 | 1 | |
| | S | 0 | 1 | 0 | L0 | M0 | 0 | 1 | 1 | |

It can be seen in the example given above, that during the four clock periods where signal ACC-G is high, the products of the bits of multiplier A'$_1$ by the multiplicand, are applied every clock period, to inputs I-Op of cells 16G-3 to 16G-0. At the end of these four clock periods the sum inputs, I-S, for the next clock period are 11101110 and the carries are 10000000. If there were no further operands to consider, these would be combined to produce a final sum 01101110. This sum represents the first term in the expression 00010010, so the decimal equivalent is −18.

During the next four clock periods, the products of the bits of multiplier A$_2$ by multiplicand B$_2$ are applied to inputs I-Op of cells 16D-3 to 16D-0. At the end of these four clock periods the sum inputs, I-S, for the next clock period are 00010010 and the carries are 01000000. (Both these expressions have been rearranged here so the lowest-order bit is on the right and the highest-order bit is on the left.) If there were no further operands to consider, these would be combined to produce a final sum 01010010. This sum represents the sum of the first two terms in the expression $$S = -A_1B_1 + A_2B_2 + A_3B_3$$

except that the highest order bit must be inverted in order to remove the effect of the separator bit that was initially loaded. Thus, the sum of the first two terms is the binary number 11010010 which we recognize as negative because the highest-order bit is "1". The two's complement is 00101110, so that decimal equivalent is $-46$; which equals $-(-6)(-3) + (7)(-4)$.

During the next four clock periods, the products of the bits of multiplier $A'_3$ by multiplicand $B'_3$ are applied to inputs I-OP of cells 16G-3 to 16G-0. At the end of this third multiplying period, signal ACC-G is high. The carries are not yet included in the result. Therefore, four additional clock periods (signal ACC-D at high level) and an additional pulse, signal f on FIG. 2, are used to obtain the final result at the sum outputs of the cells. The final result on last line S of the table is correct except that the highest-order bit needs to be inverted. Thus, the final sum of products is the binary number 10110100 which we recognize as negative because the highest-order bit is "1". The two's complement is 01001100, so the final result (in decimal form) is $$S = -(-6)(3) + (7)(-4) + (-6)(5) = -76$$

When the sum of an odd number of products is calculated, the result appears at the "sum" outputs of the accumulator cells, the least significant bit appearing at output O-S of cell 16G-O. The logic circuit transfers this result into the output register by storing the least significant bit coming from cell 16G-O into stage 21-0 of the register.

In this case, logic circuit 20 should transfer the bits from outputs 19-3, 19-2, 19-1 and 19-0 into stages 21-7, 21-6, 21-5 and 21-4 and the bits from outputs 19-7, 19-6, 19-5 and 19-4 into stages 21-3, 21-2, 21-1 and 21-0, respectively.

An inverter 22 is provided to invert the most significant bit which is modified by the separating bit. In effect, in the chosen example, the most significant bit is 0 although the result should be negative.

Conversely, if the sum of an even number of products is calculated, the result appears on outputs O-S of the cells, the least significant bit being an output O-S of cell 16D-O and the most significant bit being an output O-S of cell 16G-3. In this case, the logic circuit should transfer the bits from outputs 19-7 to 19-0 into stages 21-7 to 21-0, respectively, of the register.

Figure 3:
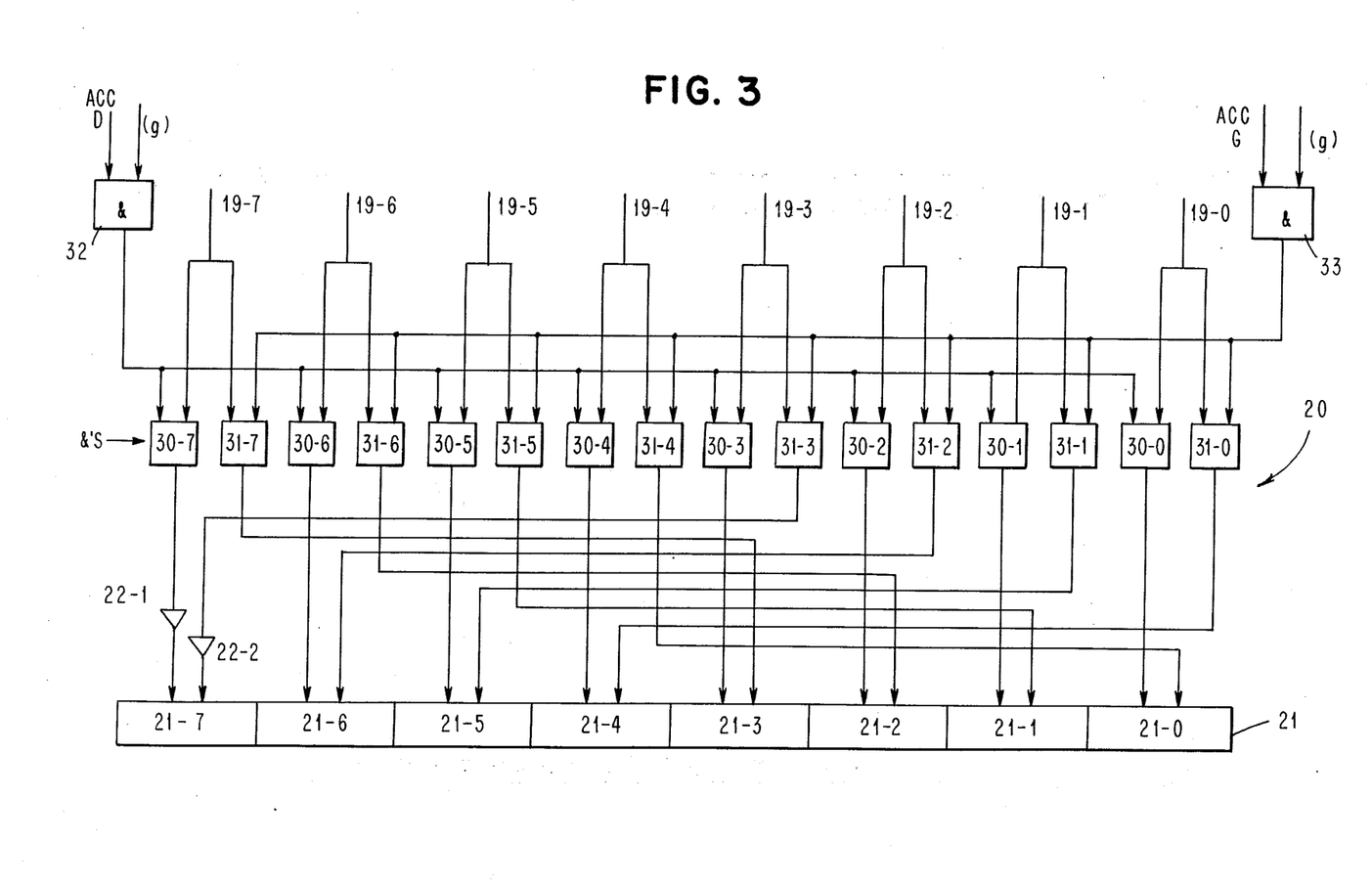
FIG. 3 is a detailed representation of circuit 20 shown on FIG. 1.

A circuit able to ensure this function is shown on FIG. 3. This circuit includes two series of gates 30-7 to 30-0 and 31-7 to 31-0. The gates of both series are associated by pairs, each pair being connected to an output of the accumulator. For example, the pair of gates 30-7 and 31-7 is connected to output 19-7. The outputs of gates 30-7 to 30-0 are connected to stages 21-7 to 21-0 of register 21. The outputs of gates 31-7 to 31-4 are connected to stages 21-3 to 21-0 and the outputs of gates 31-3 to 31-0 are connected to stages 21-7 to 21-4.

Gates 31-7 to 31-0 are opened by a signal issued from AND circuit 33 when signal ACC-G is high in the same time as the transfer signal. Consequently, the bits from outputs 19-3 to 19-0 are transferred into stages 21-7 to 21-4 and the bits from outputs 19-7 to 19-4 are transferred into stages 21-3 to 21-0. This condition appears when the last accumulation has been performed to the left.

Gates 30-7 to 30-0 are opened by a signal issued from AND circuit 32 when signal ACC-D is high in the same time as the transfer signal. Consequently, the bits from outputs 19-7 to 19-0 are transferred into stages 21-7 to 21-0. This condition appears when the last accumulation before the transfer operation has been performed to the right.

Inverters 22-1 and 22-2 invert the most significant bit of the result.

Now, referring to FIG. 4, an example will be described of an adding cell which can be used as cells 16G-2 to 16G-0 and 16D-2 to 16D-0. This cell includes an exclusive OR circuit 40 receiving the previously defined "operand" bit on its input I-Op 41, the "sum" bit of the preceding cell on its input I-S 42, the "carry" bit on its input I-C 43. The output of circuit 40 is connected to a latch 44 which will store and apply the "sum" output bit, on every clock signal, to output O-S 45 connected to the next cell. Latch 44 receives clock pulses H through line 46 and resetting signal R(a) through line 47. The cell also includes a majority detection circuit 48 the inputs of which are common to exclusive OR circuit, namely 41, 42, 43, which outputs a bit "1" when number "1" pertains to a majority on its three inputs. The output of circuit 48 is connected to a latch 49 which stores the carry of the adding operation and applies this carry bit on every clock signal to circuits 40 and 48. Latch 49 receives pulses H through line 46 and signal R(a) through line 47. The truth table for this circuit is Table II, above.

Figure 5:
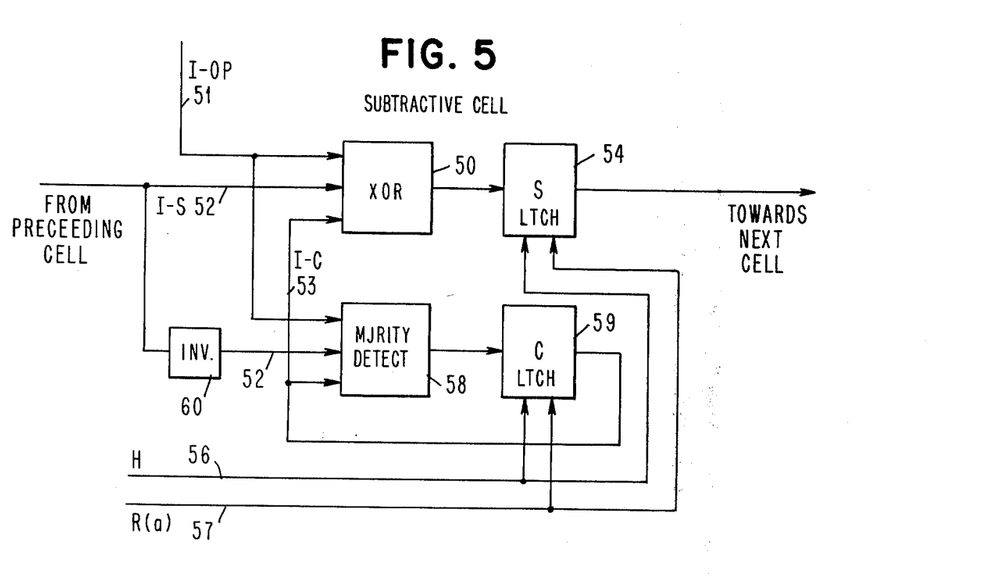
FIG. 5 shows a subtractive cell which can be used in the accumulator.

FIG. 5 is a schematic representation of a subtractive cell which can be used in stages 16G-3 and 16D-3 of the accumulator. This cell includes the same basic elements as the adding cell, namely an exclusive OR circuit 50, a latch 54, a majority circuit 58 and a latch 59. Circuit 50 is provided with three inputs I-O 51, I-S 52 and I-C 53 as previously defined. Latch 54 is used to store the "sum" bit and is controlled by clock pulse H through line 56 and resetting pulse R(a) through line 57.

Majority circuit 58 receives the "operand" bit through line 51, the inverted "sum" bit through circuit 60 and line 52' and the carry bit through line 53. Latch 59 stores the carry bit of the subtraction and this bit is applied to input 53 as controlled by clock pulses H carried on line 56. The latch is reset by signal (a) applied via line 57. This logic circuit provides the "sum" and "carry" bits as a function of the input bits according to truth table III.

The means for carrying out operand complementation comprises means for, in effect, inverting the bits of an operand and adding 1 to the binary number obtained in this way. The inverting operation can be performed by exclusive OR circuits, an input of which receives the sign bit or a complementation signal provided by circuits 5 and 6 (FIG. 1) and the second input of which receives a bit of the operand. The bit at the output of each exclusive OR circuit is the inverse of the operand bit applied to the input if the operand should be inverted and it is equal to the operand bit applied to the input in the second case where the conversion is not required.

Figure 6:
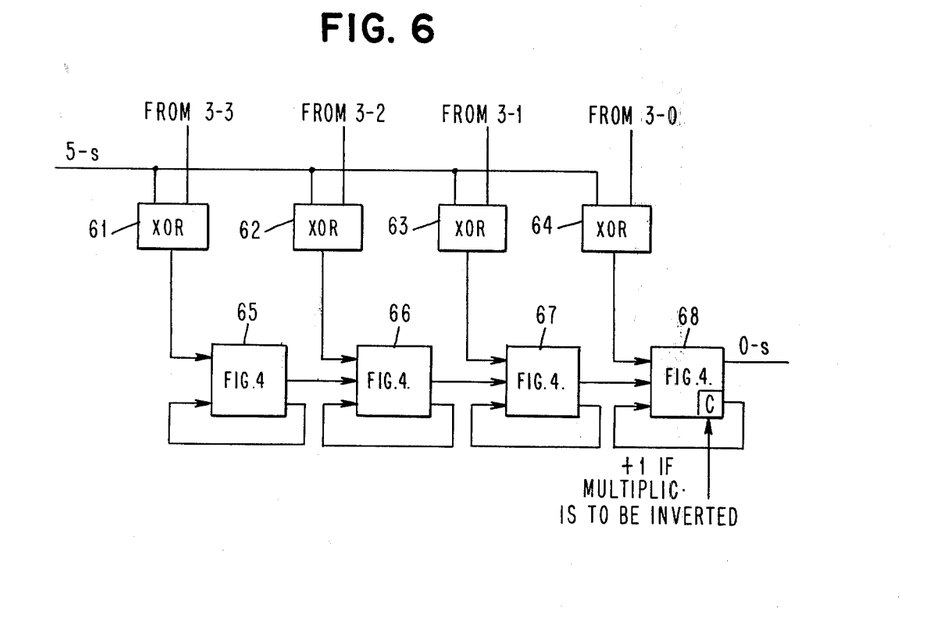
FIG. 6 shows further details of circuits 7 and 8 of FIG. 1.

FIG. 6 schematically shows an embodiment which can provide the function of circuits 7 and 9 (FIG. 1) by two's complementing the multiplier and delivering its bits in series through line 9-s, starting with the bit with the lowest weight.

This circuit includes four exclusive OR circuits 61, 62, 63 and 64, an input of which is connected to stages 3-3, 3-2, 3-1 and 3-0 of register 3, respectively. The second input of each exclusive OR circuit is line 5-s.

Figure 4:
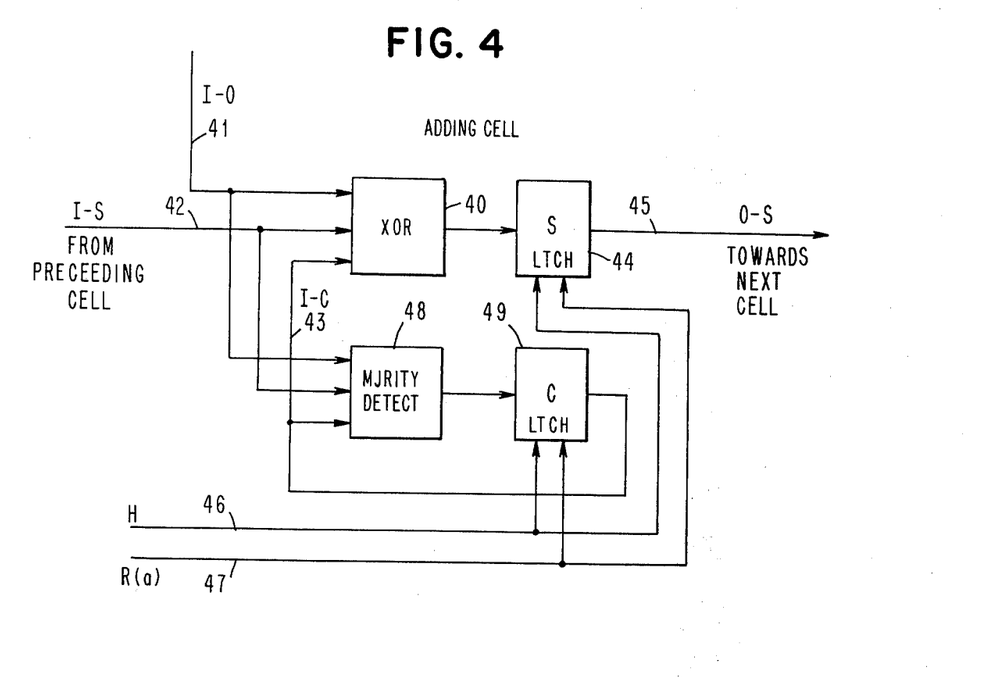
FIG. 4 shows an adding cell which can be used in the accumulator.

The multiplier bits inverted by exclusive OR circuits 61, 62, 63 and 64, should the sign be negative, are applied to the operand inputs of four adding cells as shown in FIG. 4.

In the last cell, the carry store output latch shown as block C, is set to 1 if the multiplier sign bit is negative. Thus, +1 will be added to the number formed by the inverted bits of the multiplier.

Therefore, the complement will be provided bit by bit on sum output O-S of adding cell 68.

If the multiplier is positive, its bits are not inverted by the exclusive OR circuits and the carry store latch of the last cell 68 is not set to 1, so that the set of cells 65, 66, 67 and 68 is used for transmitting, on every clock signal, the multiplier bits in series on output line 9-s.

This circuit need not be described in further detail since it is indicated just as an example and those skilled in the art are well versed in the building of such circuits. However, it should be noted that an advantage of this particular circuit is that it is comprised of the same cells as the accumulator, which makes the embodiment of the multiplier-accumulator easier.

Inverting the multiplicand bits under control of circuit 6 (FIG. 1) is performed by four exclusive OR circuits an input of which is line 6-s and the second input of which receives each of the multiplicand bits.

Figure 7:
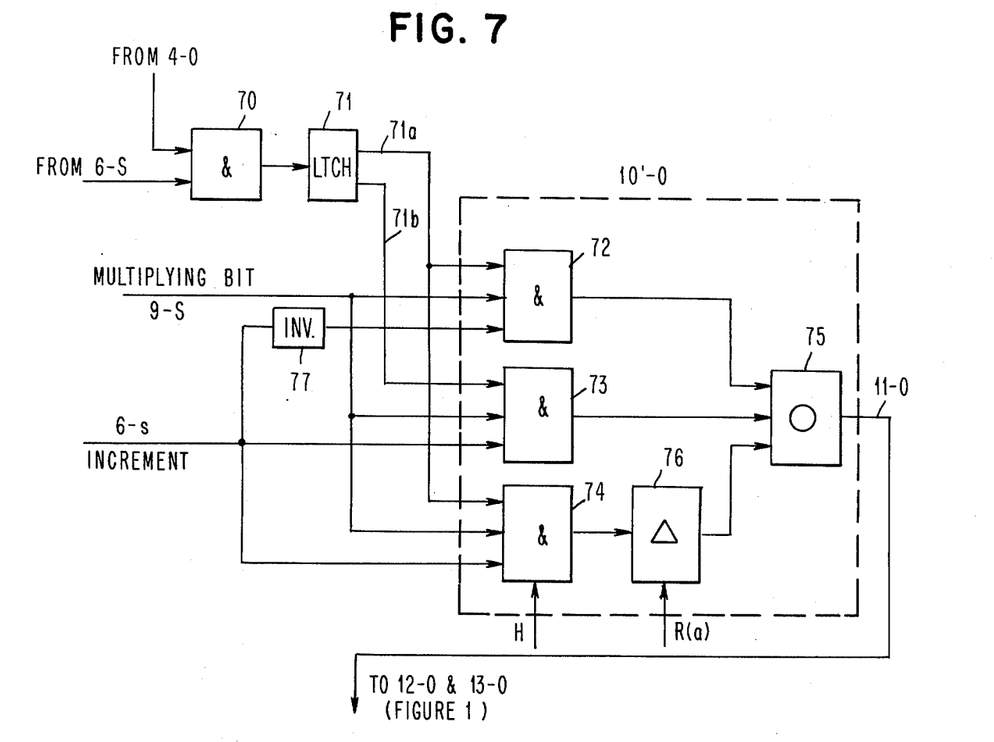
FIG. 7 shows a means for two's complementing the multiplicand.

To perform the two's complementation, it is necessary to, in effect, add +1 to the number obtained by inverting the bits when the complementation control signal on line 6-s is high. However, if +1 were actually to be added to the level of circuit 8, four clock periods would be necessary to propagate the carries of the addition, which would take too much time. Consequently, according to a preferred embodiment of this invention, the addition of +1 is performed in cells 16G-0 or 16D-0 of the accumulator according to whether the multiplicand to be inverted is accumulated to the left or to the right. The circuit of FIG. 7 is provided for this purpose. FIG. 7 shows the connection between stage 4-0 of register 4 and line 11-0 of the accumulator shown on FIG. 1, including multiplying circuit 10.

The circuit shown on FIG. 7 includes an exclusive OR circuit 70 receiving the least significant bit of the multiplicand, from stage 4-0 and the complementation control issued from circuit 6. The output of exclusive OR circuit 70 is connected to a polarity holding latch 71 which provides the input bit at its output 71-a and the inverted input bit at its output 71-b.

This multiplying circuit comprising AND circuit 10 shown on FIG. 1 is equivalent to circuit portions within broken line 10'-0 of FIG. 7. Circuit 10'-0 includes three AND circuits with three inputs 72, 73 and 74, an OR circuit 75 receiving, as inputs, the outputs of AND circuits 72, 73 and of a delay circuit 76, connected to AND circuit 74. The output of OR circuit 75 is connected to gates 12-0 and 13-0 through line 11-0.

The first inputs of AND circuits 72 and 74 are connected to line 71-a and the first input of AND circuit 73 is connected to line 71-b. The second inputs of AND circuits 72, 73 and 74 are connected to line 9-s. The third inputs of AND circuits 73 and 74 are connected to increment control line 6-s and the third input of AND gate 72 is connected to line 6-s through inverter 77.

The circuit shown in FIG. 7 operates as follows. If the multiplicand is not to be complemented, the INCREMENTATION signal on line 6-s is low. Consequently, AND gates 73 and 74 are not enabled and provide a bit 0 to OR circuit 75 whatever the values of the bits on their other inputs may be, and AND gate 72 is conditioned, which causes the least significant bit of the multiplicand multiplied by the bit of the multiplier, to be transmitted to the accumulator through OR circuit 75. In this case, the partial products of the non-two's complemented multiplicand, by the bits of the multiplier, are transmitted to the accumulator.

When the multiplicand is to be complemented, the INCREMENTATION signal on line 6-s is high, AND gates 73 and 74 are enabled, but AND gate 72 is not. The bit on line 71-a is the inverse of the less significant bit of the multiplicand. If this last bit is equal to 1, the bit on line 71-a is 0 and the bit on line 71-b is 1. Consequently, the product of this bit 1 by the multiplier bit is transmitted to the circuit through AND gate 73. This corresponds to adding +1 to the number formed by the inverted bits of the multiplicand. In effect, assuming that the multiplicand to be complemented is 1011, the number formed by the inverted bits is 0100 and if +1 is added, 0101 is obtained. This operation does not involve any carry.

Conversely, if the least significant bit of the multiplicand to be two's complemented is equal to 0, i.e., a multiplicand equal to 1010, the number formed by the inverted bits is 0101 and the two's complement is 0110. The bit on line 71-a is 1 and the bit on line 71-b is 0. Consequently, AND gate 73 provides a bit 0 whatever the bit of the multiplier applied to its input may be. AND gate 74 provides an output bit equal to the product of bit 1 by a bit of the multiplier. If this bit is 1, AND gate 74 provides a bit 1 to delay circuit 76. This bit is stored into circuit 76 for one clock period under control of pulses H. Consequently, OR circuit 75 provides a bit 0 to the accumulator, which corresponds to the last bit of the two's complement. During the following clock period, the bit stored in circuit 76, is applied to the accumulator, which corresponds to a propagation of the carry generated by the addition of +1 required for obtaining the two's complement.

The circuit as described with reference to FIGS. 1 to 7 carries out algebraic sums of positive and/or negative operands, but it is obvious that it can also be used for summing up always positive operands. In this case, it would not be necessary to provide means to complement the operands. Consequently, circuits 5, 6, 7 and 8 could be deleted and the accumulator could only consist of adding cells.

In the circuit described while referring to FIGS. 1 to 7, the result is expressed by an eight-bit number. In several applications, it is necessary for the result of an operation to have the same number of bits as the input operands. Consequently, it might be necessary to truncate the result to a four-bit number.

Various methods can be used to carry out a truncating operation in accordance with the applications of the multiplier-accumulator of this invention. A means for truncating the result is described below but it is obvious that other means could also be chosen.

The following weights can be assigned to the bit positions of operands expressed in binary form:

$$2^{+1} \; 2^0 \, . \, 2^{-1} \; 1^{-2}$$

Consequently, the result of a multiplication will comprise four figures before the "binary point" and its bits will have the following weights:

$$2^3 \; 2^2 \; 2^1 \; 2^0 \; . \; 2^{-1} \; 2^{-2} \; 2^{-3} \; 2^{-4}$$

In order to have homogeneous operands and results, the bits of the truncated result should have the same weights as the bits of the operands. In the final result of an accumulation, it will therefore be necessary to keep the bits with the following weights:

$$2^{+1} \; 2^0 \; 2^{-1} \; 2^{-2}$$

and therefore, to eliminate the two leftmost bits and the two rightmost bits. Referring back to FIG. 1, this means taking the results out of positions 21-5, 21-4, 21-3 and 21-2 of the output register.

When overflow occurs, the two L.H. bits (which are to be eliminated in the truncation) will be different from the first bit to be kept. This results from the properties of the numbers expressed in binary (true or two's complement) code. In effect, the positive or negative numbers:

000x.xxxx or 111x.xxxx are, respectively, equal to the numbers 0x.xxxx or 1x.xxxx Consequently, if the first three bits are identical, the two L.H. bits can be eliminated without modifying the result.

Conversely, if these first three bits are not identical, it is not possible to eliminate the two L.H. bits without first modifying the result. Overflow has occurred.

To truncate the result to the right, it is possible to simply eliminate the two R.H. bits of the result. To come as close as possible to the actual result despite this truncating operation, the truncated result can be "rounded off" by adding +1 in the position to the right of the one where the truncating operation is to be carried out. This can be performed at the beginning by adding +1 into cells 16G-1 and 16D-1 since the bits of the result can be arranged in different orders as the number of products to be accumulated is even or odd.

These variations, which are not required for the present invention to work properly, will not be described in detail and are only given here as an example to show how the multiplier-accumulator can be adapted for various applications.

As said before, the above-described device is provided for carrying out operations on four-bit operands but it is clear that this number was only chosen as an example to facilitate an understanding of the drawings. To process n-bit operands, it is sufficient to increase the capacities of the various registers and of the accumulator and to add AND circuits 10 and gates 12 or 13 as required.

Figure 8:
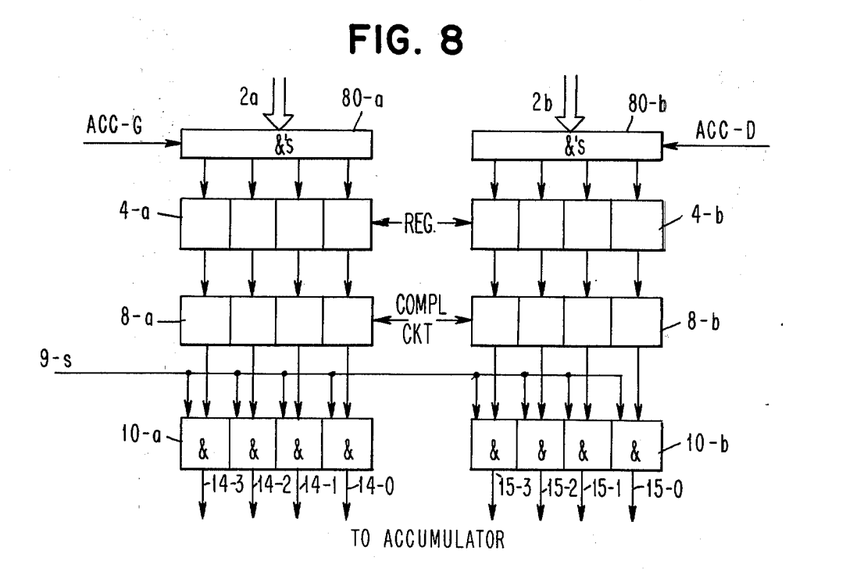
FIG. 8 shows another possible embodiment of a section of the circuit shown in FIG. 1.

In addition, a particular means has been described for diverting the partial products to be accumulated into the appropriate part of the accumulator. However, it will be clear to those skilled in the art that other means can be used for this purpose. For example, FIG. 8 schematically shows another device for directing the partial products into the accumulator. The multiplicand is simultaneously applied through two buses 2a and 2b to two sets of gates 80-a and 80-b opened by signals ACC-G and ACC-D.

According to the signal condition, the multiplicand is loaded into register 4-a or 4-b. The outputs of registers 4-a and 4-b are connected to complementing circuits 8-a and 8-b. The outputs of circuits 8-a and 8-b are applied to two sets of AND gates 10, 10-a and 10-b in which the bits of the multiplicand or its two's complement are multiplied by the bits of the multiplier or of its two's complement. The outputs of AND circuits 10-a and 10-b form lines 14-3 to 14-0 or 15-3 to 15-0 of the circuit shown in FIG. 1. This embodiment requires more circuits than the embodiment shown in FIG. 1 but it permits the use of shorter clock periods, which can be an advantage.

While the invention has been particularly shown and described with reference to a preferred embodiment thereof, it will be understood by those skilled in the art that the above and other changes in form and details may be made therein without departing from the spirit and scope of the invention.

What is claimed is:

1. A multiplier-accumulator for accumulating a sum of products of n-bit operands $S = \Sigma \, A_i B_i$ in which $A_i B_i$ are successively calculated and added to the sum of the preceding products comprising:

input means for holding a multiplier $A_i$ and a multiplicand $B_i$ of a product to be accumulated;

multiplying means responsive to said input means for providing the partial products of multiplicand $B_i$ by each bit in the multiplier;

accumulating means containing 2n adding positions, and in which the contents of each position can be provided to the next adjacent position, the contents of the last position being provided to the first position; and diverting means connected between said multiplying means and said accumulating means for transferring partial products of $A_i B_i$ to a predetermined n of said adding positions, and transferring partial products of $A_{i+1} B_{i+1}$ to the other n of said adding positions.

2. A multiplier-accumulator for accumulating an algebraic sum of products of n-bit operands $S = \Sigma \pm A_i B_i$ in which $\pm A_i B_i$ are successively calculated and algebraically accumulated, comprising:

input means for providing a multiplier $A_i$ and a multiplicand $B_i$ of a product to be accumulated;

multiplying means responsive to said input means for providing the partial products of multiplicand $B_i$ by each bit in the multiplier;

accumulating means comprising a first group of n positions and a second group of n positions, wherein the contents of each position in each group can be provided to the next adjacent position in the group and the contents of the last position in each group can be provided to the first position in the other group; and diverting means having inputs connected to receive partial products from said multiplying means, and having outputs selectively connected to each of said groups of said accumulating means for providing successive sets of partial products alternately to said first group of n positions and to said second group of n positions for accumulation each set of partial products comprising all the partial products of a given term $A_i B_i$.

3. The multiplier-accumulator of claim 2 wherein:

each of said positions of said accumulating means has at least two inputs and a sum output, a first input being connected to said diverting means for receiving a bit of a partial product, and the sum output being connected to the second input of the next adjacent position, said sum output providing a signal representing the algebraic sum of the input signals.

4. The multiplier-accumulator of claim 3 wherein: each of said positions also has a carry output and a carry input, said carry output being connected through a delay to said carry input.

5. The multiplier-accumulator of claim 4, particularly adapted for use in a system wherein negative numbers are expressed in complement form, further including: means connected between said input means and said accumulating means for selectively complementing $A_i$ or $B_i$ or both, in dependence upon the signs of $A_i$ and $B_i$.

6. The multiplier-accumulator of claim 4, particularly adapted for use in a system wherein negative numbers are expressed in complement form, further including:
first signalling means for providing a first signal indicating whether or not $A_i$ is in complement form;
first complementing means connected in the data path between said input means and said accumulating means for complementing $A_i$ in response to said first signal indicating that $A_i$ is in complement form;
second signalling means for providing a second signal when $A_i$ is in true form and the product $A_iB_i$ is to be subtracted from a previous accumulation, or when $A_i$ is in complement form and the product $A_iB_i$ is to be added to a previous accumulation; and
second complementing means connected in the data path between said input means and said accumulating means for complementing $B_i$ in response to the presence of said second signal.

7. The multiplier-accumulator of claim 6 wherein, within each group of positions of said accumulating means:
the most numerically significant position comprises means for producing a sum output and a carry output in response to first, second and carry inputs in accordance with the following truth table

| Inputs | | | Outputs | |
|---|---|---|---|---|
| first | second | carry | sum | carry |
| 0 | 0 | 0 | 0 | 0 |
| 0 | 0 | 1 | 1 | 1 |
| 0 | 1 | 0 | 1 | 0 |
| 0 | 1 | 1 | 0 | 0 |
| 1 | 0 | 0 | 1 | 1 |
| 1 | 0 | 1 | 0 | 1 |
| 1 | 1 | 0 | 0 | 0 |
| 1 | 1 | 1 | 1 | 1 | and each of the other positions comprises means for producing a sum output and a carry output in response to first, second and carry inputs in accordance with the following truth table

| Inputs | | | Outputs | |
|---|---|---|---|---|
| first | second | carry | sum | carry |
| 0 | 0 | 0 | 0 | 0 |
| 0 | 0 | 1 | 1 | 0 |
| 0 | 1 | 0 | 1 | 0 |
| 0 | 1 | 1 | 0 | 1 |
| 1 | 0 | 0 | 1 | 0 |
| 1 | 0 | 1 | 0 | 1 |
| 1 | 1 | 0 | 0 | 1 |
| 1 | 1 | 1 | 1 | 1 |

8. The multiplier-accumulator of claim 7 further including:
result register means connected to said accumulating means for receiving a final accumulated result; and
means connected between said accumulating means and said result register means for inverting one bit from said accumulating means.

* * * * *